April 19, 1949.   G. F. SHEPPARD   2,467,917
TORQUE ARM SUSPENSION UNIT

Filed July 21, 1947   4 Sheets-Sheet 1

INVENTOR
GEORGE F. SHEPPARD
BY
ATTORNEY

April 19, 1949.   G. F. SHEPPARD   2,467,917
TORQUE ARM SUSPENSION UNIT
Filed July 21, 1947   4 Sheets-Sheet 2

INVENTOR
GEORGE F. SHEPPARD
BY
ATTORNEY

April 19, 1949.     G. F. SHEPPARD     2,467,917
TORQUE ARM SUSPENSION UNIT
Filed July 21, 1947.     4 Sheets-Sheet 3

INVENTOR
GEORGE F. SHEPPARD
BY
ATTORNEY

April 19, 1949.　　　G. F. SHEPPARD　　　2,467,917
TORQUE ARM SUSPENSION UNIT
Filed July 21, 1947　　　　　　　　　　4 Sheets-Sheet 4
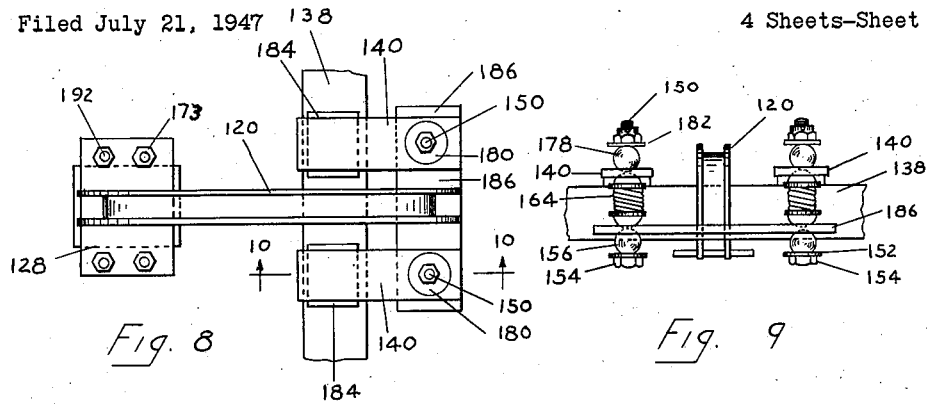
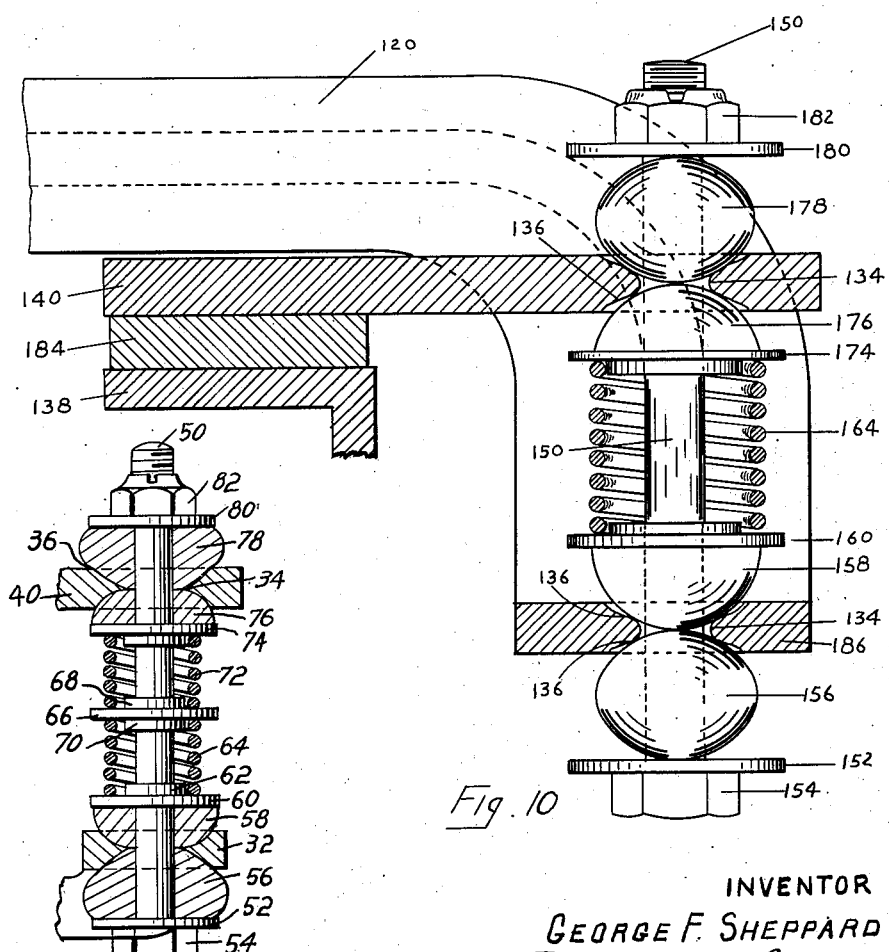
INVENTOR
GEORGE F. SHEPPARD
BY
ATTORNEY Patented Apr. 19, 1949

2,467,917

UNITED STATES PATENT OFFICE 2,467,917

TORQUE ARM SUSPENSION UNIT

George F. Sheppard, Mount Royal, Quebec, Canada

Application July 21, 1947, Serial No. 762,446

10 Claims. (Cl. 105—132.1)

Introduction

This invention relates to torque arm suspension units, and more particularly to torque arm suspension units adapted to prevent the turning of transmission generator drive assemblies operating on railway car truck axles.

The suspension units customarily used have proven unsatisfactory, in that the metal to metal construction in the moving parts were in constant need of lubrication, the lack of which, through wear, caused slack connection, resulting in noise and eventual breakage.

The present invention deals fundamentally with these conditions, and it aims to devise a thoroughly practical solution for them.

To more readily understand the invention it must be understood that the said generator drive has a housing, which is mounted on a railway truck axle and which is adapted for the free rotation of the axle within the housing, said housing enclosing the necessary gears, etc., to drive a drive shaft which is at substantially right angles to the axle, said drive shaft extending from an extension of the main housing. The torque arm, which is an elongated member, shaped to clear obstructions, has one end detachably fixed to the extension of the housing, and its other or distal end, resiliently suspended from the transom of the truck. The suspension assembly is designed to compensate for the many movements between the truck axle and the truck transom.

The invention

The invention resides in the mounting of the distal end of said torque arm to said truck transom, by means of resilient rubberlike ball bearing members which are adapted, as will be described, to eliminate movable metal to metal contacts.

More specifically, in accordance with the invention, at least one of the supporting or supported members, i. e. truck transom or torque arm, is provided with a plate. There is a hole in this plate, countersunk at each surface to form opposed annular seats. A connecting rod, for example a bolt, extends through the hole to connect one end with the other supporting or supported member. At the end of the connecting rod, remote from this connection, is a retaining means; for example a head or nut. Between the retaining means and the plate is a resilient bearing of a character to be described, and at the other side of the plate is a companion bearing of a similar character, and the combination includes means for placing the said resilient bearings under compression. The bearings each form at least a portion of a sphere, and are impaled on the connecting member through a hole extending therethrough, the spherical surface of each bearing engaging one of the annular seats. The effective diameter of each member is greater than that of the hole so that it engages its annular seat with a portion compressed through the hole against the companion spacing member, thereby separating the plate and the connecting member and preventing contact of the metal plate with the metal connecting rod. Preferably both the truck transom and torque arm include a plate of the nature described, and companion bearings as mentioned, clinch each plate and intermediate pressure means, like a spring, intervenes the inner bearings. A retaining means is provided at each end of the connecting rod, preferably a head at one end and a nut at the other, compression on the assembly being provided by adjusting the nut.

Detailed description

The nature and details of the invention will be more readily understood from the following detailed description, when read in conjunction with the accompanying drawings, in which—

Figure 8 is a plan view of the dual suspension mounting.

Figure 9 is an end view of the dual suspension mounting.

Figure 10 is an enlarged section of the mounting taken on the line 10—10, Figure 8.

Figure 11 is a fragmentary side elevation partly in section of a device such as that shown in Figures 1 to 5 illustrating the parts under working conditions.

Figure 1:
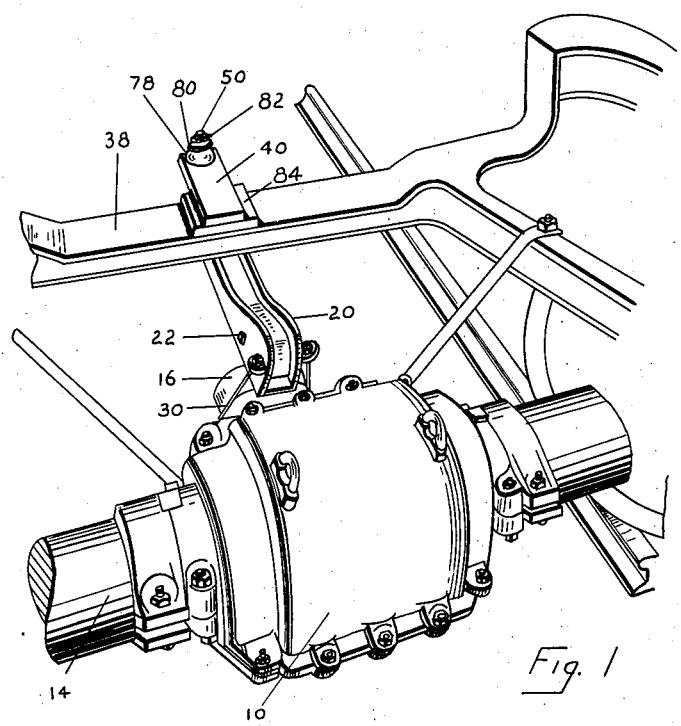
Figure 1 is a perspective view of a complete transmission assembly including the method of connecting the torque arm to the transom bar of the truck according to the invention.
Figure 2:
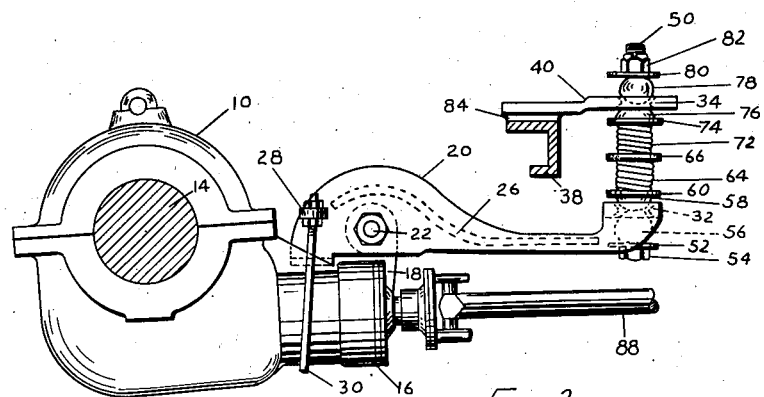
Figure 2 is a side elevation of the transmission assembly illustrating the single mounting.
Figures 3, 4:
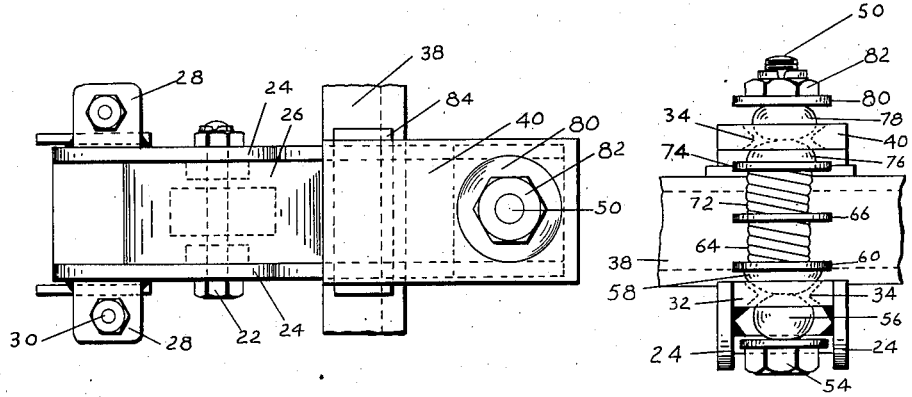
Figure 3 is an enlarged plan view of the torque arm and mounting in the single form.
Figure 4 is an end view of the torque arm and mounting illustrated in Figure 3.

With particular reference to the drawings, namely Figures 1 to 5 inclusive, which illustrate a preferred form of single suspension mounting, 10 represents the transmission housing which is rotatably mounted on a railway car truck axle 14. An extension 16 from the main housing 10 is equipped with an eyelet 18 which is attached to torque arm 20 by a bolt 22.

The torque arm 20 is composed of two side members 24 which are spaced apart by a web 26 welded to the side members 24. A pair of flanges 28 extending outwardly from the side members 24 are adapted to be engaged by the ends of a U bolt 30 which encircles the extension 16 of the main housing. The U bolt 30 is attached to the flanges 28 by means of suitable washers, nuts and lock nuts, as illustrated. This method of mounting the torque arm to the drive housing 16 is restricted to housings now in use, and is adapted for conversion purposes. Another method of attachment is detailed as an alternative and is used in preference for new installations.

On the opposite or distal end of the torque arm 20, the two side members 24 are spaced apart by a spacer 32, said spacer 32 being bored and counterbored from both sides providing annular shoulders 34, the counterboring from each side having a radius "X" which provides annular seats 36.

Welded to the transom 38 of the car truck is the suspension mounting plate 40, the overhanging portion of said plate 40 being bored and countersunk from both sides providing an annular shoulder 34 with rounded annular seating surfaces 36 similar to those counterbored with the spacer 32. The length of the plate 40 is such that the axis of the boring in the spacer 32 is common with the axis of the plate boring and that the axis of the holes is disposed vertically. In a preferred form, the resilient connection between the torque arm 20 and the mounting plate 40, consists of a connecting rod 50 which is adapted to carry an assembly of washers, helical springs and rubberlike, spherical and hemispherical bearings which co-act to insulate the connecting rod 50 from both the plate 40 and the torque arm spacer or plate 32 in order to provide resiliency to the mounting. The rubberlike bearing members are centrally bored to provide passage of the connecting rod shank, the complete assembly being held by a head 54 on one end and a nut 82 threadably engaged to the other end of the connecting rod, 50.

Figure 5:
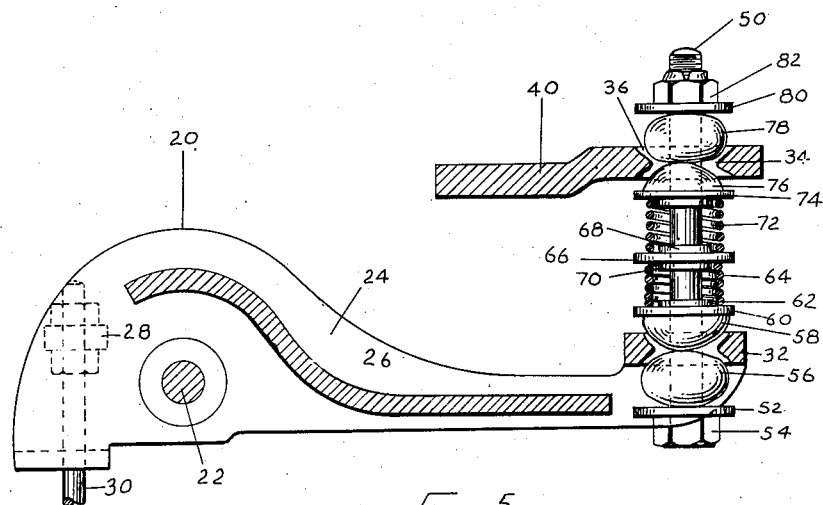
Figure 5 is a side elevation partly in section of the single suspension torque arm.

With particular reference to Figure 5, which illustrates the assembled suspension mounting in its preferred form, a washer 52 is placed on the connecting rod 50 adjacent the head 54, and a rubberlike sphere 56 is placed on the bolt 50 next to the washer 52. The shank of the bolt 50 is then passed through the opening in the torque arm spacer 32 allowing the rubberlike sphere 56 to seat against the underside of the annular shoulder 34 on the seat 36. A hemisphere 58, of rubberlike material similar to the sphere 56, is placed on the shank of the bolt 50 backed up by a metal washer 60, the rounded portion of the hemisphere seating against the shoulder seat 36 on the upper side of the spacer 32, the shoulder 34 thereby being clinched between the opposing spherical faces of the rubberlike bearings. The washer 60, which seats against the flat side of the hemisphere 58, is equipped with an upwardly-extending annular boss 62 centered around the hole in the washer, said boss 62 is adapted to center a helical spring 64 which is seated against the washer 60. Centered on the bolt 50 and seated against the end of the helical spring 64 is a dividing washer 66 which has an annular boss 68 and 70 respectively on each face similar to the boss 62 on the washer 60. The washer 66, when seated against the spring 64, centers the spring 64 by means of the boss 70 on the underside of the washer 66, while the upper boss 68 centers a second helical spring 72 which is seated on the upper face of the washer 66. A fourth washer 74 similar to the washer 60 is placed boss down, over the bolt 50 to seat against, and center, the upper end of the spring 72. Placed over the bolt 50, flat face down is a second hemisphere 76 of rubberlike material similar to the hemisphere 58, the flat face of said hemisphere being seated against the flat face of the washer 74. The bolt 50 is then passed through the boring in the suspension plate 40, portions of the spherical surface of the hemisphere 76 seating against the seating surface 36 on the underside of the annular shoulder 34. A second spherical centrally-bored bearing 78, similar to 56 of rubberlike material, is placed on the bolt 50 to seat against the upper seat 36 of the shoulder 34 and clinch the shoulder 34 of the suspension plates 40 between the opposed spherical faces of the bearings 76—78. A fifth washer 80 is placed over the bolt 50, seated against the rubberlike sphere 78 and said complete resilient suspension assembly is retained on the bolt 50 by a nut 82 which is threadably engaged to the bolt 50, and seated against the upper face of the washer 80. Once adjusted to apply proper compression on the suspension assembly, the nut may be set in any of well-known methods such as cotter pin or lock nuts. In the course of being assembled, the above-noted "proper compression" supplies sufficient force to deform the spherical surface of the bearings, causing the bearing to "flow" into the cavity between the shoulders 34 and the connecting member 50, thus insulating the connecting member 50 against the contact with the shoulders 34.

It will be understood from the nature of this description that the cross sectional diameter of the rubber-like spheres and hemispheres exceeds the diameter of the hole formed by the shoulders 34 in both the spacer 32 and the suspension plate 40, so that when the adjacent spheres are seated on opposite seats of the shoulders 34, the plate 40 or the spacer 32 are held resiliently between the two spherical faces. As an example with a diameter of 1¼" between the opposing ends of the shoulders 34, the diameter of the spheres should be 2¼" and the radius of the countersunk seats 36 should be 1¾".

The spherical and hemispherical bearings of rubberlike material should be resistant to oils, solvents, oxidation, change of temperature, sunlight, and should also be resistant to salt solutions and water. It must be highly resilient under compression, tough and easily processed. The applicant favours the use of synthetic rubber, having the above characteristics, such as a long chain synthetic rubber made by the polymerization of chloroprene (monochloro - butadiene, $H_2CCClCHCH_2$), sold under the commercial name "neoprene," or "Hycar" and "Buna N," which are synthetic rubbers made by the co-polymerization of unsaturated organic chemicals such as butadiene and acrylonitrile.

In order to compensate for the varying heights of the transom, a block 84 of required thickness is welded between the transom 38 and the suspension plate 40 after the truck has been levelled.

A modification of the invention consists of a double suspension assembly which is illustrated in Figures 6 to 10 inclusive, and is used to ensure greater suspension strength, and to provide greater clearance between the suspension assembly and the generator drive shaft 188. This necessitates a modified design of torque arm which passes over the transom 138 rather than under it, as illustrated in Figures 1 to 5 inclusive. The torque arm 120 may be fixed to the housing extension 116 by eyelet and bolt 122, and reinforced by a U bolt as previously detailed or may be attached by a modified form which is illustrated in 6, 7, 8, and 9. This modified form is especially adapted for new installations, in which elongated attaching lugs 190 are cast integrally with the housing extension 116. Flanges 128 extending outwardly from the side members 120 of the torque arm are drilled co-axially with the lugs 190 and are adapted to be fixed to the lugs 190 by connecting rods such as bolts and nuts 192 and 174 respectively. A groove 196 which extends laterally across the housing extension 116, is adapted to seat a tongue 198 which is fixed to the seating surface of the torque arm below the flanges 128. This tongue 198 and groove 196 co-act to provide greater strength against shearing. The torque arm is adapted to pass over the transom 138 and turn downwardly to below the level of the top of the transom 138. Welded at right angles to the end of the torque arm 120 and substantially parallel with the truck axle 114 and the transom 138 is a torque arm plate 186, said plate 186 being drilled and counterbored adjacent both ends providing a hole having annular shoulders 134 and seats 136 similar to the spacer 32 and the suspension plate 40.

Suspension plates 140 are welded to the transom 138 on center with the borings in the arm 186, said plates 140 being of proper length and shimmed to proper height, by means of extra plates 184, to ensure the connecting rod 150 of the suspension assembly, being in a substantially vertical position.

Said suspension plates 140 are bored and counterbored to provide annular shoulders 134 and seating surfaces 136 as in the lower or torque arm plate 186.

Identical suspension assemblies as those described above may be used, but it is preferred by the applicant to slightly modify the assembly to secure adequate clearance between the torque arm plate 186 and the generator drive shaft 188. The modification consists of leaving out one of the helical springs 64—72 and the seating washer 66, thus using only one spring 164 which is seated, at each end, on the bossed washers 160 and 173, which are in turn seated against the flat faces of the rubberlike hemispheres 158 and 176, which, in co-operation with the spheres 156 and 178, clinch the shoulders 134 on the torque arm plate 186 and the suspension plates 140.

Figure 6:
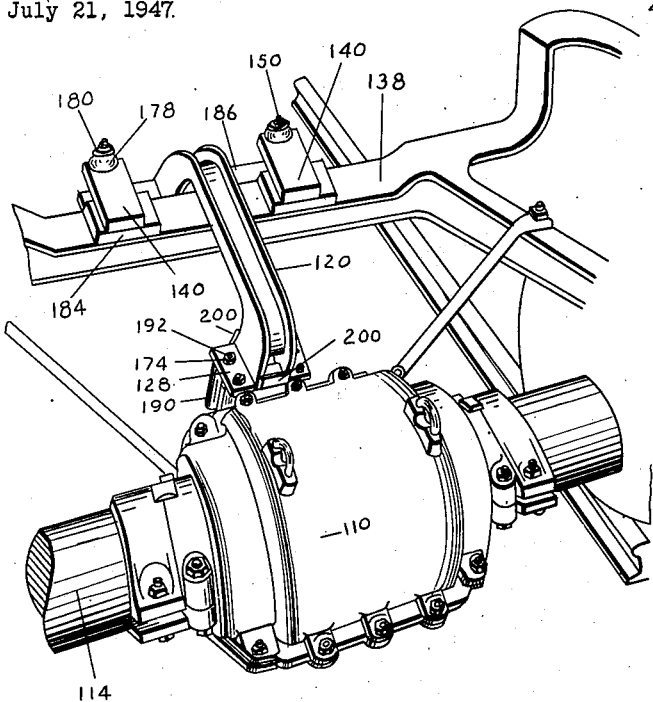
Figure 6 is a perspective view of a transmission assembly using a dual torque arm suspension.
Figure 7:
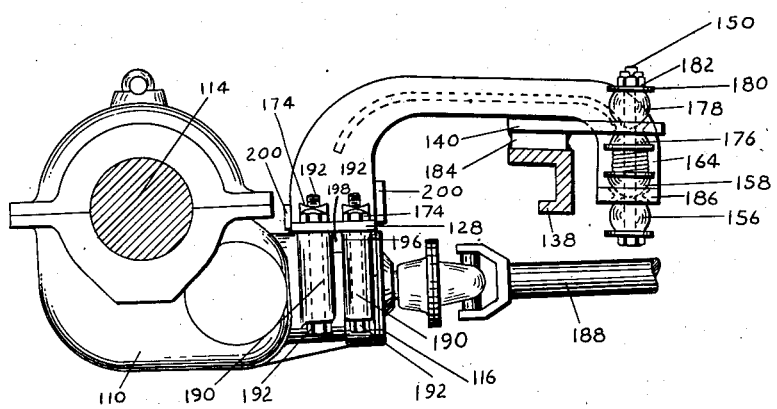
Figure 7 is a side elevation of the transmission assembly and dual suspension.

Strengthening members 200 may be welded, as illustrated in Figures 6 and 7, to the torque arm side members 120 and the flanges 128 in order to provide greater strength to the flanges 128.

Advantages

A primary advantage of the applicant's structure over those at present in use is that the synthetic rubber bearings, which insulate the moving metal parts from one another, eliminate the greasing and oiling necessary when metal is working on metal.

The long wear experienced by the use of the applicant's structure has materially reduced the maintenance factor necessary on the metal to metal type of suspension assemblies now in use.

It will be understood that, without departing from the spirit of the invention or the scope of the claims, various modifications may be made in the specific expedients described. The latter are illustrative only, and not offered in a restrictive sense, it being desired that only such limitations shall be placed thereon as may be required by the state of the prior art.

The sub-titles used throughout the specification are merely to simplify reference thereto and should otherwise be disregarded.

I claim:

1. A mounting device for providing a connection between a torque arm for a generator drive assembly from a railway car truck axle and a railway car body, comprising, a first suspension plate rigidly connectable to the car, a second suspension plate connectable to the torque arm and adapted to lie substantially parallel to the first plate and in spaced relation thereto, each plate being formed with an opening adapted to be aligned with the opening in the other plate, a connecting rod extending between the plates and through said openings, the diameter of the connecting rod being less than that of the openings to provide a clearance space between the walls of the openings and the face of the rod, each plate being provided with a radiused countersunk recess on each face thereof about the opening to provide a bearing surface, and for each recess a spherical member of a resilient hydrocarbon solvent-insoluble elastomer having an axial opening of slightly greater diameter than that of the rod by which said spherical member is slidably mounted on said rod but free to move axially thereof and having a face of spherical contour bearing against the recess, there being thus outer and inner spherical members contacting each plate, retaining means at a terminal point of each end of said connecting rod and acting against the outer resilient bearing members, resilient means mounted on said rod acting outwardly against the inner spherical members thereby to press each inner spherical member against its adjacent suspension plate, the opening in the spherical members being slightly greater in diameter than the diameter of the connecting rod, the diameter of the opening in each plate being considerably greater than the diameter of the connecting rod, the size and shape of said recesses corresponding substantially with the uncompressed size and shape of the adjacent portion of the spherical member, the respective sizes of the openings, recesses, spherical members and of the connecting rod, the thickness of the plates and the resilience of the spherical members and resilient means being such that portions of the spherical members are forced into the space between the walls of the recesses and the adjacent faces of the connecting rod until contact is made between portions of the adjacent spherical members and a resilient shield is thus formed between the walls of each opening and the face of the connecting rod.

2. A mounting device, according to claim 1, wherein each of the resilient spherical members on the inside of the respective plates is a segment of a sphere in overall contour, and each of the spherical members on the outside of the respective plates is a complete sphere in overall contour.

3. A mounting device, according to claim 1, wherein there is a head on one end of said connecting rod and a threaded end and a nut on the other end of said connecting rod, and washers separate the head and nut from the adjacent outer spherical members.

4. A mounting device, according to claim 1, wherein the outwardly acting resilient means includes a compression spring mounted on said connecting rod.

5. A mounting device, according to claim 1, wherein said outwardly acting resilient means has a compression spring mounted on said connecting rod and there is a washer separating said spring from the inner spherical members.

6. A mounting device, according to claim 1, wherein each of the resilient spherical members on the inside of the respective plates is a hemisphere in overall contour, and each of the spherical members on the outside of the respective plates is a complete sphere in overall contour, there is a head on one end of the connecting rod and a threaded end and nut on the other end of the connecting rod, and washers intervene the head and nut and the adjacent outer spherical members, the outwardly acting resilient means includes a compression spring mounted on the connecting rod, and there is a washer separating the spring from each inner spherical member.

7. A mounting device for providing a connection between a torque arm for a generator drive assembly from a railway car truck axle and a railway car body, comprising, a rigid suspension member including a plate, said plate being formed with an opening, a connecting rod extending through the opening in said plate, the diameter of the connecting rod being less than that of the opening to provide a clearance space between the walls of the opening and the face of the rod, said plate being provided with a radiused countersunk recess on each face thereof about the opening to provide a bearing surface, and for each recess a spherical member of a resilient hydrocarbon solvent-insoluble elastomer one at each side of said plate and each having an axial opening by which it is slidably mounted on said rod and free to move axially thereof, and having a face of spherical contour bearing against a side of the plate contacting the recess thereof, retaining means on the rod contacting one of said spherical members and resilient means mounted on said rod and acting in compression against said other spherical member, the clearance space between the walls of the opening and the face of the rod permitting a portion of a spherical member to be forced between the walls of the opening and the face of the connecting rod until contact is made between portions of the adjacent spherical members and a resilient shield is thus formed between the walls of the opening and the face of the connecting rod, and means on said rod at the end opposite said retaining means for forming a flexible connection from said rod to a second suspension member, one of said suspension members being a part of the torque arm of the generator drive assembly and the other of said suspension members being a part of the railway car body.

8. A suspension unit, according to claim 7, wherein one of said spherical members is substantially a segment of a sphere in overall contour and the other of said spherical members is substantially a complete sphere in overall contour.

9. A mounting device, according to claim 1, wherein the outwardly acting resilient means includes a plurality of compression springs mounted on the connecting rod.

10. A mounting device, according to claim 1, wherein the outwardly acting resilient means includes a plurality of compression springs mounted on the connecting rod, and a washer separates the respective springs.

GEO. F. SHEPPARD.

REFERENCES CITED

The following references are of record in the file of this patent:

UNITED STATES PATENTS

| Number | Name | Date |
|---|---|---|
| 448,260 | Rice | Mar. 17, 1891 |
| 464,253 | Peckham | Dec. 1, 1891 |
| 524,117 | Rice | Aug. 7, 1894 |
| 2,083,277 | Scott | June 8, 1947 |
| 2,389,562 | Storck | Nov. 20, 1945 |

FOREIGN PATENTS

| Number | Country | Date |
|---|---|---|
| 475,678 | Germany | Apr. 30, 1929 |